April 30, 1968     D. SCARAMUCCI     3,380,709

VALVES AND SEALS THEREFOR

Filed Feb. 2, 1965     2 Sheets-Sheet 1

INVENTOR.
DOMER SCARAMUCCI

BY Dunlap & Laney
ATTORNEYS

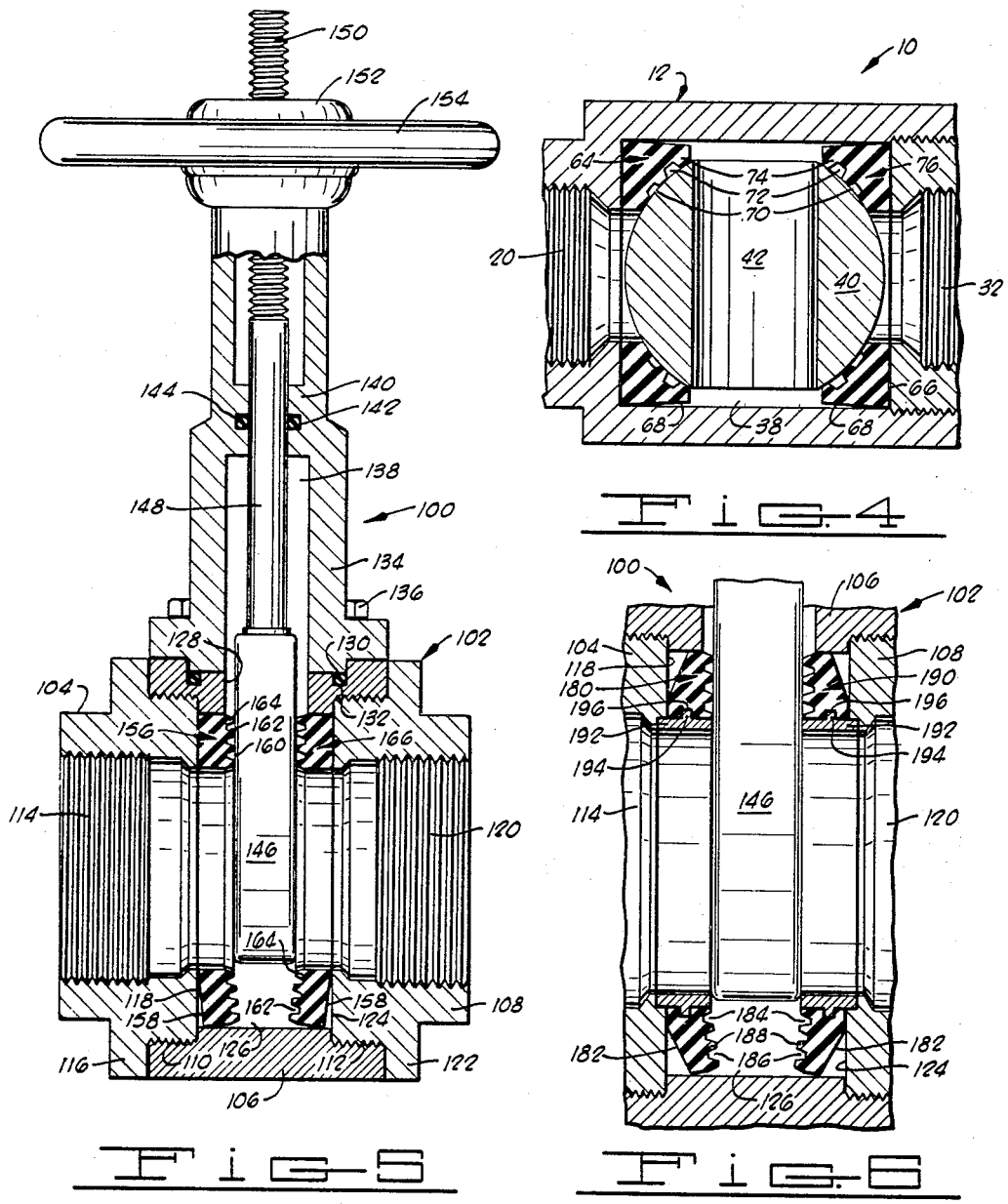

United States Patent Office 3,380,709
Patented Apr. 30, 1968

3,380,709
VALVES AND SEALS THEREFOR
Domer Scaramucci, Oklahoma City, Okla., assignor to Balon Corporation, Oklahoma City, Okla., a corporation of Oklahoma
Filed Feb. 2, 1965, Ser. No. 429,874
10 Claims. (Cl. 251—172)

ABSTRACT OF THE DISCLOSURE

A resilient material, downstream valve seal having its inner peripheral portion wedged between the valve member and body and the outer peripheral portion free to flex toward and away from the valve member, with the seating surface of the seal having a plurality of annular grooves therein and the outer portion of the seating surface projecting into the path of movement of the valve member.

---

This invention relates generally to improved valves useful in fluid handling circuits. More particularly, but not by way of limitation, this invention relates to an improved valve having novel seals therein.

For the most part, plug and gate valves constructed in the past have depended upon interference between the valve plug or gate valve member with a resilient seal to obtain fluid-tight closure of the valve. In such valves, the portion of the resilient seals forming the fluid-tight seal is usually disposed adjacent the flow passageway through the valve. With the seals constructed in this manner, the sealing portion relaxes when it is disposed adjacent the opening through the plug or when the gate valve member is in the open position permitting the sealing portion to move into the opening and, thus, being subjected to the shearing action of the valve member as it is moved into the closed position.

In general, the resilient seals have been constructed from a relatively soft material, such as natural or synthetic rubber, for use in relatively low pressure service or from a relatively hard resilient material, such as nylon or Teflon when the valve is to be used in relatively high pressure service. Due to the relatively high flexibility characteristic of the soft seal materials, their service life has been reasonably satisfactory so long as they are used with relatively low pressures. However, it has been found that even when used in low pressure service the seals do not last as long as is desirable due to the shearing action of the valve member. When the relatively soft seal materials are used in high pressure service, they are subject to being extruded from the valve or into the opening in the valve member and are more likely to be sheared during closure thereof.

The use of the relatively hard seal materials has resulted in a more satisfactory high pressure seal, but when constructed in accordance with previous practices, the seals do not produce a satisfactory low pressure seal. Also, seals constructed from relatively hard materials, due to their lower flexibility, are very susceptible to damage as a result of the shearing action of the valve member during closure.

Generally, this invention provides an improved valve including a valve body having a flow passageway therethrough and a valve member therein movable from a position wherein the passageway is open to a position wherein the passageway is closed. A pair of resilient annular seals are located in the valve body. Each of the seals has a first surface in sealing engagement with the valve body and has a second surface arranged to form a fluid-tight seal with the valve member when the valve member is in the position closing the passageway. The second surface has a portion thereon relatively remote from the passageway projecting into the path of the valve member. Also, the second surface is provided with a plurality of annular grooves forming a plurality of pressure responsive annular lands, whereby the seal will provide the optimum low pressure seal.

One object of the invention is to provide an improved valve having an extended service life.

Another object of the invention is to provide an improved valve having seals therein that provide a satisfactory low and high pressure seal.

One other object of the invention is to provide an improved valve having the seals therein engageable with said valve member, but constructed so that they are not subject to the shearing action of the valve member during closure, thereby extending the service life of the valve.

Still another object of the invention is to provide an improved seal for use in valves that will form an effective low and high pressure seal when installed in the valve even though the seal is constructed from relatively hard material.

A further object of the invention is to provide an improved seal that may be quickly and easily manufactured.

A still further object of the invention is to provide an improved seal that, when installed in a valve, is responsive to fluid pressure in the valve to augment the sealing engagement between the seal and the valve member.

The foregoing and additional objects and advantages of the invention will become more apparent as the following description is read in conjunction with the accompanying drawings wherein like reference characters denote like parts in all views and wherein:

FIG. 4 is also a cross-sectional view similar to FIG. 2, but showing the valve member in the closed position;

FIG. 5 is a vertical cross-sectional view through a gate valve, also constructed in accordance with the invention; and FIG. 6 is an enlarged cross-sectional view of a portion of a gate valve similar to FIG. 5, but illustrating the use of reinforcing members with another embodiment of seals disposed therein,

EMBODIMENT OF FIG. 1

Figure 1:
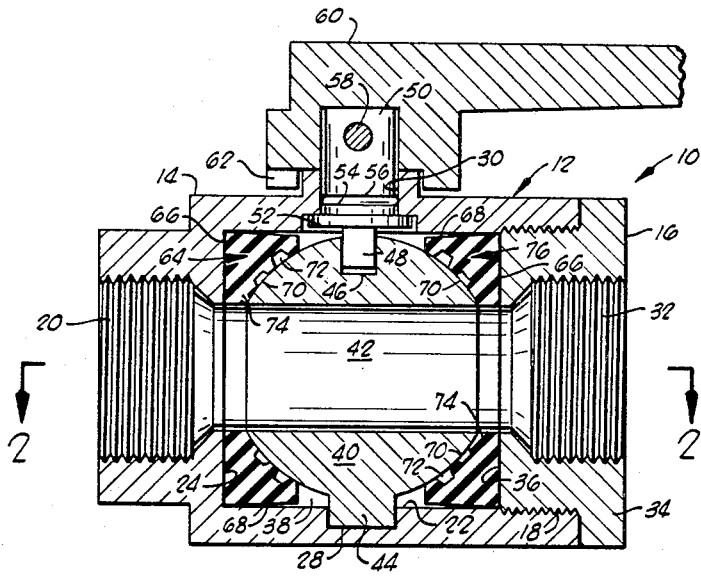
FIG. 1 is a vertical cross-sectional view of a ball valve constructed in accordance with the invention.

Referring to the drawings and to FIG. 1 in particular, shown therein and generally designated by the reference character 10 is a ball valve constructed in accordance with the invention. As illustrated, the ball valve 10 includes a valve body 12 having an inlet portion 14 and an outlet portion 16 threadedly connected as shown at 18.

The inlet portion 14 includes a partially threaded inlet 20 and an enlarged counterbore 22 forming a shoulder 24 adjacent the inlet 20. The inlet portion 14 also includes a recess 28 formed in the lower portion thereof and an opening 30 extending through the upper portion thereof.

The outlet portion 16 includes a partially threaded outlet 32, an annular flange 34 arranged to abut the end of the inlet portion 14 and an end 36 that cooperates with the counterbore 22 and the shoulder 24 to form a chamber 38 in the valve body 12.

A valve ball 40 is disposed in the chamber 38 and has an opening 42 extending therethrough. The opening 42 when aligned with the inlet 20 and outlet 32, forms a flow passageway extending through the valve 10. The lower exterior surface of the valve ball 40 is provided with a lug 44 sized to fit the recess 28 in the inlet portion 14 whereby the valve ball 40 is pivotally supported therein. The upper exterior surface of the valve ball 40 is provided with a rectangular recess 46 that is sized to receive a rectangular end 48 on a valve ball operating member 50 that extends upwardly through the opening 30 in the inlet portion 14.

The operating member 50 is provided with an exterior flange 52 disposed within the chamber 38 and engageable with the valve body 12 to limit the upward movement of the operating member 50 therein. An O-ring seal 54 is disposed in an annular recess 56 in the operating member 50 and sealingly engages the valve operating member 50 and the interior of the opening 30 to prevent the escape of fluid from the chamber 38.

At its upper end, the operating member 50 is provided with a pin 58 for attaching an operating handle 60 thereto. The handle 60 is provided with a lug 62 arranged to engage abutments (not shown) on the valve body 12 to limit the rotation of the handle 60 and the valve ball 40 to approximately ninety (90) degrees.

A resilient annular upstream seal 64 is disposed in the chamber 38 adjacent the inlet 20 and has a surface 66 thereon in sealing engagement with the shoulder 24. As may be seen more clearly in FIG. 2, the upstream seal 64 also includes a peripheral surface 68 that extends angularly with respect to the adjacent portion of the body 12.

A concave surface 70 on the upstream seal 64 is disposed adjacent the valve ball 40. The surface 70 has a radius that is considerably less than the radius of the valve ball 40, whereby the portion thereof most remote from the flow passageway extending through the valve 10 projects into the path of the valve ball 40. However, the seal 64 is sized so that the portion of the surface 70 thereon adjacent the flow passageway in the valve 10 will be at substantially the same distance from the center of rotation of the ball 40 as the exterior surface thereon, whereby only a very light engagement between the seal 64 and valve ball 40 occurs. The projection of the portion of the surface 70 into the path of the valve ball 40 is most clearly shown in the upper left-hand portion of FIG. 2 wherein the upstream seal 64 is illustrated in the relaxed condition. In the lower left-hand portion of FIG. 2, it can be seen that the surface 70 sealingly engages the valve ball 40.

The surface 70 is also provided with a plurality of grooves 72 defining a plurality of lands 74. The grooves 72 are widest adjacent the valve ball 40 whereby the lands 74 have a trapezoidal cross-sectional configuration with the smallest surface of the lands 74 engaging the valve ball 40. As illustrated, the grooves 72 are of progressively increasing depth beginning with the groove 72 closest to the flow passageway. The increased depth of the grooves 72 remote from the flow passageway increases the flexibility and pressure responsiveness of the seal 64.

A downstream seal 76 is also disposed in the chamber 38. The seal 76 is identical in all respects to the upstream seal 64 although it is oppositely disposed in the chamber 38 and has the surface 66 thereon in sealing engagement with the end 36 of the outlet portion 16. In addition to the surface 66, the downstream seal 76 also includes the surfaces 68 and 70, as described in connection with the upstream seal 64.

In the preferred form of the seals 64 and 76, they are constructed for relatively low pressure use from a resilient elastomer that is relatively soft, such as natural or synthetic rubber. However, if the seals are to be used with relatively high pressures, they are preferably constructed from a relatively hard resilient elastomer, such as natural or synthetic rubber having a hardness of from 80 to 90 durometer or from a resilient synthetic resin such as nylon, Teflon or Delrin.

OPERATION OF THE EMBODIMENT OF FIG. 1

As illustrated in FIG. 1, the valve 10 is shown in the fully open position, that is, with the opening 42 in the valve ball 40 aligned with the inlet 20 and outlet 32. As the handle 60 is rotated, the valve ball 40 moves to the position shown in FIG. 2 wherein the flow passageway through the valve 10 is restricted, but not yet closed.

Figure 2:
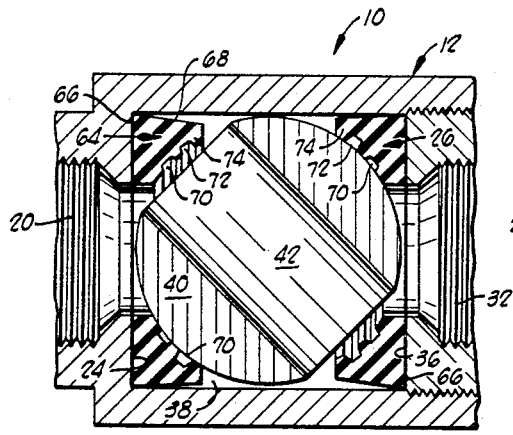
FIG. 2 is a cross-sectional view of the valve of FIG. 1 taken along the line 2—2 of FIG. 1, and showing the valve member in another operating position.

It can be observed in the lower left-hand and upper right-hand portions of FIG. 2 that the upstream seal 64 and the downstream seal 76 are in sealing engagement with the surface of the valve ball 40. The upper left-hand and lower right-hand portions of FIG. 2 illustrate the relaxed condition of the seal adjacent the opening 42 in the valve ball 40.

As can be appreciated, the restricted flow through the inlet 20, opening 42 in the valve ball 40 and the outlet 32 will not move either of the seals into a position wherein they are subjected to the shearing action of the valve ball 40 as it is closed.

Figure 3:
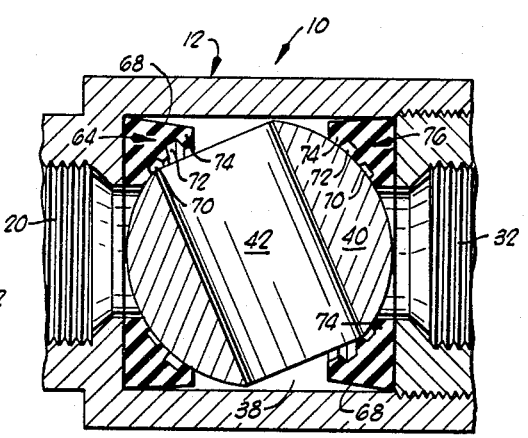
FIG. 3 is a view similar to FIG. 2, but showing the valve member in still another operating position.

As shown in FIG. 3, the valve ball 40 has been rotated until it has engaged the initial portions of the upstream and downstream seals 64 and 76, respectively, (see the upper left-hand and lower right-hand portions of FIG. 3). If the fluid pressure in the inlet 20 is relatively low, the valve 10 will be completely closed at this time. However, if the pressure in the inlet 20 is relatively high, the lands 74 adjacent the flow passageway through the valve may be deformed permitting a small amount of fluid to flow through the valve 10. It should be pointed out that if such flow does continue, the lands 74 will be moved relatively away from the surface of the valve ball 40, preventing the possibility of damage to the seal during closure of the valve 10.

As also illustrated in FIG. 3, the remaining two lands 74 on the upstream seal 64 and downstream seal 76 project slightly into the path of the valve ball 40, but, due to the flexibility of the seals, the surface 68 is moved relatively toward the valve body 12. Therefore, it can be seen that the valve ball 40 will merely cam the seals radially outwardly thereby avoiding damage to the lands 74 as the valve ball 40 is closed.

The valve ball 10 is illustrated in FIG. 4 in the fully closed position, that is, with the opening 42 in the valve ball 40 disposed at approximately ninety (90) degrees relative to the flow passageway through the valve 10. With the valve ball 40 fully closed, each of the lands 74 on the upstream seal 64 and downstream seal 76 are in sealing engagement with the valve ball 40.

If fluid flow is to occur through the valve 10 with the valve ball 40 in the closed position, the pressure in the inlet 20 must be sufficiently high to deform each of the lands 74 on the upstream seal 64 relatively away from the surface of the valve ball 40 and also to deform the lands 74 on the downstream seal 76 away from the valve ball 40. However, if fluid flows past the upstream seal 64 into the chamber 38, such fluid will act on the surface 68 of the downstream seal 76 to deform the seal 76 into tighter sealing engagement with the valve ball 40. Manifestly, if the pressure in the inlet 20 is relatively low, the upstream seal 64 and downstream seal 76 will be effective to form fluid-tight upstream and downstream seals with the valve ball 40.

Each of the lands 74 on the upstream seal 64 and downstream seal 76 are individually pressure responsive due to their trapezoidal cross-sectional configuration. It can be appreciated that the flat surface on the lands 74 in engagement with the surface of the valve ball 40 will rotate about the base of the lands 74 as fluid pressure is applied thereto. As a consequence of the rotation, the lands 74 will be deformed into tighter sealing engagement with the valve ball 40 until the pressure is sufficient to rotate the flat surface on the lands 74 until it is clear of the valve ball 40.

It should also be pointed out that the provision of a plurality of lands 74 and grooves 72 provides an additive effect with respect to the pressure differential which must exist thereacross in order to deform the lands 74 away from the valve ball 40. Stated in another way, if it requires 100 p.s.i. to deform each land 74 then a total differential must exist across the seal 64 of at least 300 p.s.i. for the fluid to flow thereby.

Several other advantages are presented by the presence of the lands 74 and grooves 72 on the seals 64 and 76. For example, the grooves 72 provide spaces into which foreign particles adhered to the surface of the valve ball 40 may be deposited during closure of the valve. Also, the narrow flat surface of the lands 74 in engagement with the valve ball 40 provides the optimum in low pressure sealing even when the seals are constructed from relatively hard material. The trapezoidal configuration of the lands 74 provides the maximum load bearing characteristic to the seals while maintaining the low pressure sealing characteristic as previously described.

Although not illustrated, it is relatively common in the valve art to provide a floating ball or plug rather than the restrained ball illustrated in FIG. 1. That is, the valve ball 40 would be free to move in a direction generally parallel to the flow passageway extending through the valve 10. Under such circumstances, fluid pressure applied in the inlet 20 would move the ball toward the downstream seal 76 and relatively away from the upstream seal 64. Fluid in the inlet 20 could then flow past the upstream seal 64, but would be contained in the chamber 38 by the pressure responsiveness of the downstream seal 76 as previously described. Naturally, the valve 10 and the seals 64 and 76 therein will function equally as well if the pressure is applied from the outlet 32 to the inlet 20 rather than in the opposite direction as described herein.

FIG. 5 illustrates a gate valve generally designated by the reference character 100 and also constructed in accordance with the invention. As shown therein the gate valve 100 includes a valve body 102 having an inlet portion 104, a medial portion 106 and an outlet portion 108. The inlet portion 104 is connected to the medial portion 106 by threads 110 and the outlet portion 108 is connected to the medial portion 106 by threads 112.

The inlet portion 104 includes a partially threaded inlet 114, a peripheral flange 116 adapted to abut one end of the medial portion 106, and an inner end 118. Similarly, the outlet portion 108 includes a partially threaded outlet 120, a peripheral flange 122 adapted to abut the other end of the medial portion 106, and an inner end 124.

The inner wall of the medial portion 106 and the ends 118 and 124 cooperate to define a chamber 126 in the valve body 102. The inlet 114, chamber 126, and outlet 120 cooperate to define a flow passageway extending through the valve 100.

The medial portion 106 has an opening 128 extending through the upper side thereof in communication with the chamber 126 for purposes which will become more apparent hereinafter. A resilient seal 130 is disposed in a recess 132 that encompasses the opening 128. The seal 130 provides a fluid-tight seal between the medial portion 106 of the valve body 102 and a hollow extension member 134.

The hollow extension member 134 is attached to the medial portion 106 by a plurality of fasteners 136 and has an interior 138 arranged to coincide with the opening 128 extending through the medial portion 106. The extension member 134 is also provided near its medial portion with an interior flange 140 having a recess 142 extending around the interior surface thereof. An O-ring 144 is disposed in the recess 142 for purposes which will be explained hereinafter.

A gate valve member 146 is disposed in the chamber 126 and is movable therein from a position closing the flow passageway through the valve 100 to a position wherein the flow passageway is fully open. The gate valve member 146 is connected at its upper end with a valve operating member 148 that extends upwardly through the interior 138 of the extension 134 past the interior flange 140 thereon. The upper end of the operating member 148 is provided with threads 150 that are engageable with a threaded nut 152.

The threaded nut 152 is attached to and rotatable with an operating handle 154. The arrangement of the threaded nut 152 and operating handle 154 is such that rotation of the handle 154 in one direction causes the operating member 148 and the attached gate valve member 146 to move upwardly into the interior 138 of the extension member 134 opening the valve 100. Rotation of the handle 154 in the opposite direction causes the operating member 148 and the attached gate valve member 146 to move downwardly into the chamber 126 and ultimately into the position closing the flow passageway extending through the valve 100.

A resilient annular upstream seal 156 is disposed in the chamber 126 and has a surface 158 thereon having at least a portion thereof in sealing engagement with the end 118 of the inlet portion 104. The upstream seal 156 also includes a surface 160 adapted to sealingly engage the gate valve member 146.

As illustrated, the surface 160 includes a plurality of annular grooves 162 defining a plurality of annular lands 164. The grooves 162 are widest adjacent the valve member 146 whereby the lands 164 are of trapezoidal cross-sectional configuration and have the smallest surface thereon in sealing engagement with the gate valve member 146 when the gate valve member 146 is in the closed position (not shown). If desired, the grooves 162 may be of varying depth as described in connection with the seals 64 and 76 of FIG. 1.

The upstream seal 156 is illustrated in the lower portion of FIG. 5 in the relaxed condition. As shown therein, the surface 158 extends at an angle with respect to the end 118 thereby projecting a portion of the surface 160 into the path of the gate valve member 146.

A resilient annular downstream seal 166 is also positioned in the chamber 126 and is identical in construction to the upstream seal 156 though oppositely disposed in the chamber 126. The downstream seal 166 includes the surface 158 that is partially in engagement with and disposed at an angle relative to the end 124 of the outlet portion 108 of the valve body 102. As described in connection with the upstream seal 156, a portion of the surface 160 projects into the path of the gate valve member 146. The surface 160 is also provided with the plurality of annular grooves 162 defining the annular lands 164.

The seals 156 and 166 are preferably constructed from the materials described in connection with the description of the seals 64 and 76 of the embodiment of FIG. 1.

OPERATION OF THE EMBODIMENT OF FIG. 5

In the open position of the valve 100 (not shown), that is, when the gate valve member 146 has been moved upwardly into the interior 138 of the extension member 134 until the lower end thereof clears the flow passageway extending through the valve 100, the upstream and downstream seals 156 and 166, respectively, are substantially in the relaxed position as illustrated in the lower portion of FIG. 5. However, the valve member 146 remains in contact with the upper portion of the seals 156 and 166.

As the valve member 146 is moved downwardly in the chamber 126, the valve member 146 engages the seals 156 and 166 deforming the seals outwardly until the surfaces 158 are in full engagement with the end 118 of the inlet portion 104 and with the end 124 of the outlet portion 108. With the surface 158 angled outwardly from the respective ends of the inlet and outlet portions 104 and 108, the valve member 146 will merely cam the respective seals outwardly without subjecting them to any shearing forces thereby avoiding damage to the seals. Furthermore, as the lower end of the valve member 146 approaches the lands 164 on the seals 156 and 166 adjacent the flow passageway through the valve 100, the lands 164 will be deformed relatively away from the valve member 146 by fluid pressure until such time as the valve member 146 is in engagement with a sufficient number of lands 164 to withstand the pressure exerted by fluid in the inlet 114.

When the valve member 146 reaches the fully closed position (not shown), that is, when the flow passageway through the valve is completely closed, the seals 156 and 166 will be deformed outwardly until the surfaces 158 thereon are in engagement with the ends 118 and 124 of the inlet portion 104 and outlet portion 108, respectively. With the valve member 146 in the fully closed position, it can be appreciated that the force exerted thereon by fluid pressure in the inlet 114 will be carried by all of the lands 164 on the downstream seal 166. The advantages of the provision of a plurality of lands 164 and grooves 162 in the upstream and downstream seals 156 and 166 is the same as discussed in connection with the seals 64 and 76 of the embodiment of FIG. 1.

If sufficient pressure is exerted in the inlet 114, the lands 164 on the upstream seal 156 may be deformed relatively away from the valve member 146 thereby permitting fluid to flow into the chamber 126. Fluid pressure in the chamber 126 will act upon the lands 164 of the downstream seal 166 to move them into tighter sealing engagement with the valve member 146.

If the fluid pressure in the inlet 114 is sufficiently low, it will be apparent from the foregoing description that the upstream seal 156 and downstream seal 166 will be adequate to form effective fluid-tight upstream and downstream seals with the valve member 146.

EMBODIMENT OF FIG. 6

Illustrated in FIG. 6 is another embodiment of seals located in the valve 100 previously described in connection with FIG. 5. In view of the identity of the various parts of the valve 100, the same parts will be designated by the same reference characters as used in the description of FIG. 5.

As shown in FIG. 6, a resilient annular upstream seal 180 is disposed in the chamber 126 of the valve body 102 adjacent the inlet portion 104. The upstream seal 180 includes a surface 182 having a portion thereof in sealing engagement with the end 118 of the inlet portion 104. It will be noted that the surface 182 extends angularly with respect to the end 118 toward the portion of the seal 180 disposed relatively remote from the flow passageway through the valve 100. The seal 180 also has a surface 184 adapted to sealingly engage the gate valve member 146 and, as shown in the lower portion of FIG. 6, having a portion thereof disposed in the path of the gate valve member 146.

The surface 184 is provided with a plurality of annular grooves 186 defining a plurality of pressure-responsive annular lands 188. The lands 188 and grooves 186 are provided for the same purposes and function in the same manner as the grooves 162 and lands 164 of the seals 156 and 160 of the embodiment of FIG. 5. It should be noted that the increased angularity of the surface 182 as compared to the surface 158 of the seals of FIG. 5, increases the flexibility of the seal 180 and, therefore, also increases its pressure responsiveness.

A resilient annular downstream seal 190 is also positioned in the chamber 126 and is identical to the upstream seal 180 though oppositely disposed in the chamber 126. The surface 182 on the downstream seal 190 is disposed adjacent and has a portion thereon in sealing engagement with the end 124 of the outlet portion 108 of the body 102. The downstream seal 190 also includes the surface 184 having the annular grooves 186 formed therein defining the annular lands 188.

A pair of rigid annular reinforcing members 192 are also disposed in the chamber 126, but between the seals 180 and 190 and the flow passageway extending through the valve 100. As illustrated, the members 192 include a small annular flange 194 extending into an annular recess 196 formed in the seals 180 and 190 whereby the relative positions of the seals 180 and 190 with the members 192 will be maintained.

As illustrated, the reinforcing member 192 disposed adjacent the upstream seal 180 has one end in engagement with the inlet portion 104 and is sufficiently long so that the other end thereof is in engagement with the valve member 146. Similarly, the reinforcing member 192 disposed adjacent the downstream seal 190 has one end in engagement with the outlet portion 108 and is sufficiently long so that the other end thereof is in engagement with the valve member 146.

If desired, the reinforcing members 192 can be shortened so that the ends thereof adjacent the valve member 146 will not engage the valve member 146 except upon extreme deformation or destruction of the seals 180 and 190. Also, the members 192 can be bonded to their respective seal 180 and 190 if desired.

The use of the reinforcing members 192 has been found to be advantageous either when extremely soft seal materials are used in constructing the seals 180 and 190 or when the seals are constructed from relatively hard material and it is anticipated that extremely high fluid pressure will be encountered. In such cases, the reinforcing members 192 will function to prevent the extrusion of the downstream seal 190 from the chamber 126 as a result of the fluid pressure in the valve 100.

OPERATION OF THE EMBODIMENT OF FIG. 6

The valve 100 is illustrated in FIG. 6 functions in the same manner as the valve 100 as described in connection with FIG. 5. However, it should be pointed out that the angularity of the surface 182 on the seals 180 and 190 prevents the surface 182 from becoming fully engaged with the ends 118 or 124 of the inlet portion 104 and outlet portion 108, respectively. Therefore, the load exerted by the valve member 146 in response to fluid pressure in the inlet 114 is carried by that portion of the seal 190 having the surface 182 in engagement with the outlet portion 108. It can be appreciated that the seals 180 and 190 will be more flexible and, therefore, more responsive as a result of the angularity of the surface 182 whereby the seals will be more easily deformed into tighter sealing engagement with the valve member 146 in response to pressure in the chamber 126.

From the foregoing detailed descriptions, it can be seen that seals constructed in accordance with the invention can be quickly and easily manufactured. Also, the seals will be effective to form fluid-tight upstream and downstream seals when the valve is used in relatively low pressure service and effective to form fluid-tight downstream seals even when the valves are used in relatively high pressure service. Furthermore, the seals are constructed to provide the optimum low pressure sealing characteristics while maintaining the maximum load bearing ability and to avoid seal damage during closure of the valve.

It should be understood that the embodiments described herein are presented by way of example only and that many modifications and changes can be made thereto without departing from the spirit of the invention or from the scope of the annexed claims.

What I claim is:
1. A valve, comprising:
   a valve body having an inlet, an outlet, and a chamber connected with said inlet and outlet to form a flow passageway through said valve body;
   a valve member disposed in said chamber and movable therein from a position wherein said passageway is open to a position wherein said passageway is closed;
   a resilient annular non-metallic, elastomer seal disposed in said chamber encircling said outlet and having the inner peripheral portion thereof supported by the valve body and the outer peripheral portion thereof free to flex toward and away from the valve member, said seal having a surface thereon adja- cent said valve member, said surface having a portion thereon relatively remote from said passageway projecting into the path of said valve member in the relaxed status of said annular seal, and said surface having a plurality of annular grooves therein forming a plurality of pressure-responsive, annular lands for sealingly engaging said valve member, said lands and grooves each being of symmetrical configuration about an imaginary line extending normal to the surface of the valve member engaged by the lands whereby said lands undergo a maximum amount of compressional loading and a minimum amount of flexural stress during the movement of said valve member in said valve body to open and close said valve; and means for moving said valve member in a direction to slide upon said lands when said valve is opened and closed.

2. A valve, comprising:

a valve body having an inlet, an outlet, and a chamber connected with said inlet and outlet to form a flow passageway through said valve body;

a valve member disposed in said chamber and movable therein from a position wherein said passageway is open to a position wherein said passageway is closed;

a pair of annular non-metallic, elastomer seals disposed in said chamber, one of said seals being disposed adjacent said inlet and the other seal being disposed adjacent said outlet, each of said seals having the inner peripheral portion thereof supported by the valve body and the outer peripheral portion thereof free to flex toward and away from the valve member, each of said seals having a surface adjacent said valve member, said surface having a portion thereof relatively remote from said passageway projecting into the path of said valve member when the respective annular seal is in the relaxed status, and said surface having a plurality of annular grooves therein forming a plurality of pressure-responsive annular lands for sealingly engaging said valve member, said lands and grooves each being of a symmetrical configuration about an imaginary line extending normal to the surface of the valve member engaged by the lands whereby compressional loading of said lands is maximized and flexural stressing of said lands is minimized during the opening and closing movements of said valve member in said valve; and means for moving said valve member in a direction to slide upon said lands when said valve is opened and closed.

3. The valve of claim 2 wherein said annular grooves are progressively greater in depth beginning with the groove closest to said flow passageway.

4. The valve of claim 1 wherein said elastomer has a hardness of from 80 to 90 durometer.

5. A valve, comprising:

a valve body having an inlet, an outlet, and a chamber connected with said inlet and outlet to form a flow passageway through said valve body;

a valve member disposed in said chamber and movable therein from a position wherein said passageway is open to a position wherein said passageway is closed; and, a pair of annular seals constructed from a resilient synthetic resin disposed in said chamber, one of said seals being disposed adjacent said inlet and the other seal being disposed adjacent said outlet, each of said seals having the inner peripheral portion thereof supported by the valve body and the outer peripheral portion thereof free to flex toward and away from the valve member, each of said seals having a surface thereon adjacent and adapted to sealingly engage said valve member, said surface having a portion thereof relatively remote from said passageway projecting into the path of said valve member when the respective seal carrying said surface is in its relaxed status; and a plurality of annular grooves therein forming a plurality of pressure-responsive lands having a symmetrical trapezoidal cross-sectional configuration with the smallest surface adapted to sealingly engage said valve member, and each of said grooves being progressively deeper beginning with the grooves closest to said flow passageway, said symmetrical trapezoidal cross-sectional configuration of said lands effectively maximizing compressional loading of said lands and minimizing flexural stressing of said lands during the movement of said valve member in said valve body between open and closed positions.

6. A valve, comprising:

a valve body having an inlet, an outlet, and a chamber therein connected with said inlet and outlet;

a spherical valve member disposed in said chamber and having an opening extending therethrough, said valve member being rotatable from a position aligning said opening with said inlet and outlet forming a flow passageway through said valve to a position wherein said flow passageway is closed; and a pair of annular non-metallic, elastomer seals disposed in said chamber, one of said seals being disposed adjacent said inlet and the other seal being disposed adjacent said outlet, each of said seals having the inner peripheral portion thereof supported by the valve body and the outer peripheral portion thereof free to flex toward and away from the valve member, each of said seals having an arcuate surface thereon adjacent said valve member, said surface having a radius of curvature less than the radius of said spherical valve member, and having a plurality of annular grooves therein defining a plurality of annular lands, said lands being adapted to sealingly engage said valve member and responsive to fluid pressure in said valve to move into tighter engagement with said valve member to augment the seal formed therebetween, said lands each being of symmetrical configuration about an imaginary line extending normal to the surface of the valve member engaged by said lands whereby compressional loading of said lands during the operation of the valve is maximized and flexural stressing of said lands is minimized, and a portion thereon relatively remote from said flow pasageway projecting in the relaxed status into the path of said valve member, whereby the lands on said portion sealingly engage said valve member;

means for moving said valve member in a direction to slide upon said lands when said valve is opened and closed.

7. A valve, comprising:

a valve body having an inlet, an outlet, and a chamber therein connected with said inlet and outlet;

a spherical valve member disposed in said chamber and having an opening extending therethrough, said valve member being rotatable from a position aligning said opening with said inlet and outlet forming a flow passageway through said valve to a position wherein said flow passageway is closed; and a pair of annular seals constructed from a resilient non-metallic elastomer disposed in said chamber, one of said seals being disposed adjacent said inlet and the other seal being disposed adjacent said outlet, each of said seals having the inner peripheral portion thereof supported by the valve body and the outer peripheral portion thereof free to flex toward and away from the valve member, each of said seals having an arcuate surface thereon adjacent said valve member, said surface having a radius of curvature less than the radius of said spherical valve member, and having a plurality of annular grooves therein of progressively increasing depth beginning with the groove closest to said flow passageway and defining a plurality of lands of trapezoidal cross-sectional configuration, said lands being adapted to sealingly engage said valve member and responsive to fluid pressure in said valve to move into tighter engagement with said valve member to augment the sealing engagement therebetween, said lands each being of symmetrical configuration about an imaginary line extending normal to the surface of the valve member engaged by the lands whereby compressional loading of the lands during operation of the valve is maximized and flexural stressing of the lands during operation of the valve is minimized, and a portion thereof relatively remote from said flow passageway projecting into the path of said valve member when the respective seal is in the relaxed status, whereby the lands on said portion sealingly engage said valve member.

8. A gate valve, comprising:
a valve body having an inlet, an outlet, and a chamber therein connected with said inlet and outlet to form a flow passageway through said valve;
a gate valve member disposed in said chamber and movable from a position wherein said flow passageway is open to a position wherein said passageway is closed; and
a pair of annular non-metallic, elastomer seals disposed in said chamber, one of said seals being disposed adjacent said inlet and the other seal being disposed adjacent said outlet, each of said seals having the inner peripheral portion thereof supported by the valve body and the outer peripheral portion thereof free to flex toward and away from the valve member, each of said seals having a surface thereon adjacent said valve member, said surface having a portion thereof remote from said flow passageway projecting into the path of said valve member when the respective seal carrying said surface is in its relaxed status, and a plurality of annular grooves therein forming a plurality of pressure responsive lands for sealingly engaging said valve member when said valve member is in the position closing said passageway said lands and grooves each being of symmetrical configuration about an imaginary line extending normal to the surface of said gate valve member which is engaged by said lands, and means for moving said valve member in said valve body in a direction to move the portion of said gate valve member engaged by the said lands in a sliding movement across said lands during opening and closing of said gate valve.

9. The gate valve of claim 8 wherein said lands have a trapezoidal cross-sectional configuration with the smallest surface thereon in engagement with said gate valve member.

10. A gate valve, comprising:
a valve body having an inlet, an outlet, and a chamber therein connected with said inlet and outlet to form a flow passageway through said valve;
a gate valve member disposed in said chamber and movable from a position wherein said flow passageway is open to a position wherein said passageway is closed; and
a pair of annular seals constructed from a resilient elastomer disposed in said chamber, one of said seals being disposed adjacent said inlet and the other seal being disposed adjacent said outlet, each of said seals having a first surface adjacent said valve member, said first surface having a plurality of annular grooves therein of progressively increasing depth beginning with the groove closest to said flow passageway, said grooves defining a plurality of pressure-responsive annular lands of symmetrical trapezoidal cross-sectional configuration for sealingly engaging said valve member, and a portion thereof remote from said passageway projecting into the path of said valve member, a second surface disposed adjacent said valve body and extending relatively angularly with respect to said valve body toward the periphery of said seal most remote from said flow passageway whereby said seals are more flexible and responsive to pressure in said valve; and means for reciprocating said gate valve member in said valve body so that said gate valve moves across said first surface in sliding engagement with said annular lands during the opening and closing of said gate valve.

References Cited

UNITED STATES PATENTS

| | | | |
|---|---|---|---|
| 1,679,779 | 8/1928 | Oberhuber | 277—207 X |
| 1,883,609 | 10/1932 | Dennis | 277—207 X |
| 2,297,161 | 9/1942 | Newton | 251—315 |
| 2,768,643 | 10/1956 | Acomb | 137—505.42 |
| 2,858,098 | 10/1958 | Sanctuary | 251—317 X |
| 3,096,965 | 7/1963 | Margus | 251—315 X |
| 3,235,224 | 2/1966 | Grove | 251—315 X |
| 3,245,655 | 4/1966 | Oetjens | 277—207 X |

ALAN COHAN, *Primary Examiner.*

H. W. WEAKLEY, *Assistant Examiner.*